Dec. 30, 1952          C. G. SCOTT          2,623,281
BRACELET BAND HOLDING AND TRIMMING DEVICE
Filed May 2, 1950
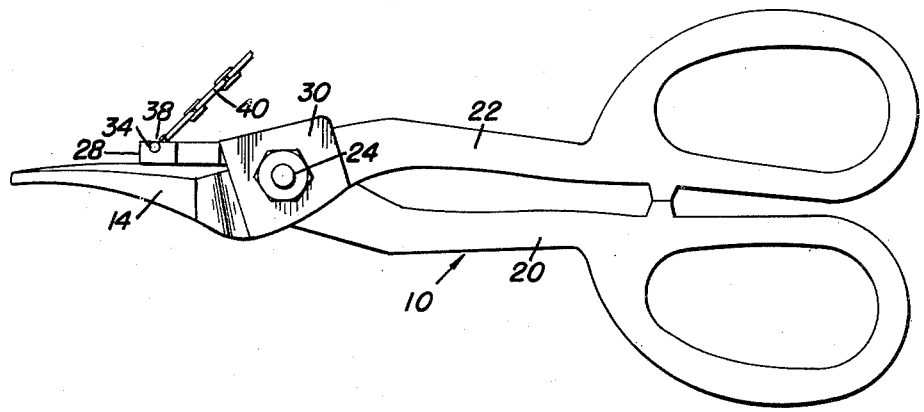
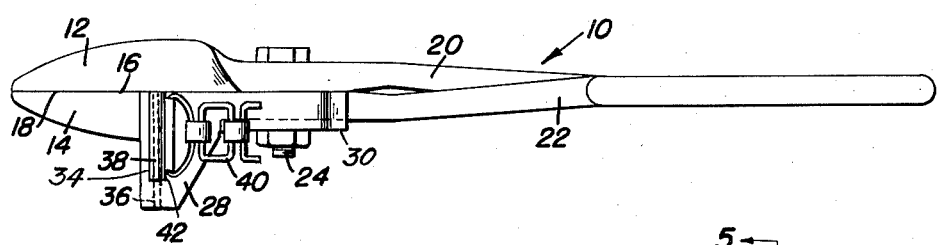
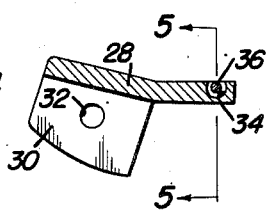
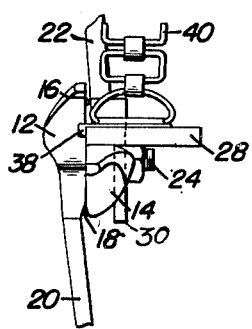
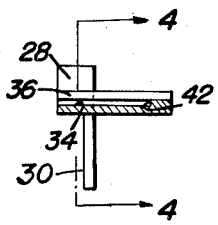
Charles G. Scott
INVENTOR.
BY *(signatures)*
Attorneys Patented Dec. 30, 1952

2,623,281

UNITED STATES PATENT OFFICE 2,623,281

BRACELET BAND HOLDING AND TRIMMING DEVICE

Charles G. Scott, Kingsport, Tenn.

Application May 2, 1950, Serial No. 159,437

5 Claims. (Cl. 30—131)

This invention relates to new and useful improvements in cutting tools and the primary object of the present invention is to provide a tool for cutting bracelet bands at a predetermined length and at a uniform length.

Another important object of the present invention is to provide a device that is quickly and readily applied to or removed from the pivot of a cutting tool in a convenient manner.

A further object of the present invention is to provide a band cutter embodying a plate having a groove and a pin in the groove that will receive the tube or sleeve of a band or bracelet to permit the sleeve to be readily cut.

A still further aim of the present invention is to provide a band cutter that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention in use;

Figure 2 is a top plan view of Figure 1;

Figure 3 is a front elevational view of Figure 1 and showing the blades open;

Figure 4 is a sectional view taken substantially on the plane of section line 4—4 of Figure 5 of the holder per se; and, Figure 5 is a sectional view taken substantially on the plane of section line 5—5 of Figure 4.

Referring now to the drawings in detail, wherein for the purpose of illustration, there is disclosed a preferred embodiment of the present invention, the numeral 10 represents the cutting tool including a pair of complemental cutting blades 12 and 14 having inner flat cutting faces 16 and 18. The blades 12 and 14 are integrally formed with levers 20 and 22.

A pivot or fastener 24 extends through the blades 12 and 14 to permit the blades to be moved toward and away from each other for effectively cutting an article between the faces 16 and 18 of the complemental blades 12 and 14.

The above described structure forms the usually accepted elements for cutting metal or the like, however, this structure is modified by a band or bracelet holder composed of a plate 28 having a perpendicular flange 30 that is formed with an aperture 32 which receives the pivot 24 to hold the plate 28 and the flange 30 against the upper edge and outer side face, respectively, of the blade 14.

The plate 28 is provided with a channel or concave groove 34 that is disposed perpendicular to the faces 16 and 18 of the blades 12 and 14. The inner end of a rod or pin 36 is fixed to the upper face of the plate 28 and is received in the channel 34. The pin 36 parallels the channel 34 and is concentric with the channel 34.

In practical use of the present invention, the sleeve or tube 38 of a bracelet or band 40 is slipped onto the pin 36 and into the open inner end of the channel 34 and pushed along the pin 36 until one end of the sleeve 38 abuts the closed end 42 of the channel 34 so that the other end of the sleeve 38 projects beyond the cutting edge of plate 28 and across both faces 16 and 18 of the blades 12 and 14 and between them (Figure 3) for cutting off said end.

As the blades 12 and 14 are moved together, the face 16 will ride against the inner edge of plate 28 to cut and remove the projecting end of the sleeve 38.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a cutter including a pair of blades having inner flat faces and a pivot joining the blades, an attachment for the cutter adapted to hold a band in a position relative to the blades to be cut by one of the blades and the attachment upon closing of the blades, said attachment comprising an angle member having first and second relatively perpendicular flanges, said first flange having an aperture therein receiving the pivot and said second flange overlying one of said blades, a lateral extension on said second flange disposed perpendicular to the inner faces of both blades, said extension having an upper flat face provided with a channel therein having an entrance at the inner faces of the blades, and a pin fixed to the extension and having a portion disposed within the channel and spaced from the walls of the channel.

2. In a cutter including a pair of blades having inner flat cutting faces and outer faces, and a combined pivot and fastener joining said blades and extending through said outer faces, a removable attachment for the cutter adapted to hold a sleeve in a position relative to the blades to be cut by one of the blades and the attachment upon a closing of the blades, said attachment comprising a plate resting against and overlying one of the blades, a flange on the plate disposed perpendicular thereto, said flange having an aperture receiving the combined pivot and fastener and held thereby against the outer face of said one blade, said plate having its inner face flush with the inner face of the blade to which it is secured for cooperation with the other blade during a cutting operation, the upper surface of said plate having a groove therein disposed perpendicular to its said inner face and having an entrance at its inner face, and a pin fixed to the plate and paralleling the groove, said pin being at least partially disposed in the groove and spaced from the walls thereof.

3. In a cutter including a pair of blades having inner flat cutting faces and outer faces, and a combined pivot and fastener joining said blades and extending through said outer faces, a removable attachment for the cutter adapted to hold a sleeve in a position relative to the blades to be cut by one of the blades and the attachment upon the closing of the blades, said attachment comprising a plate resting against and overlying one of the blades, and extending both forwardly and rearwardly of the combined pivot and fastener, a flange on the plate disposed perpendicular to the plate from portions thereof both forwardly and rearwardly of the combined pivot and fastener, said flange having an aperture receiving the combined pivot and fastener and held thereby against the outer face of said one blade, said plate having its inner face flush with the inner face of the blade to which it is secured for cooperation with the other blade during a cutting operation, the upper surface of said plate having a groove therein disposed perpendicular to its said inner face and having an entrance at the inner face of the plate, and a pin fixed to the plate and paralleling the groove, said pin being disposed at least in part in the groove and spaced from the walls thereof.

4. An attachment for a cutter having a pair of cutting blades provided with cooperating cutting edges, a pivot securing said blades together, and means for moving the blades about the pivot and relative to one another to effect cutting; comprising a main portion adapted to overlie one of the blades of the cutter in contacting relationship therewith throughout the major part of said main portion adjacent the cutting edge of said blade and having a face to align with the cutting edge of said one of the blades, said main portion having an elongated channel therein extending perpendicular to said face, a flange extending from said main portion and having an opening for receiving the pivot of said cutter, the relative position of said opening with respect to the undersurface of said main portion being such that when the attachment is secured to said one of the blades of the cutter with the pivot pin of the cutter passing through the opening in the flange the main portion may be brought into overlying position with respect to said blade and caused to lie against said blade in said contacting relationship, and a pin held at least partially i said channel and spaced therefrom for at least a portion of its length to provide a space between the pin and the channel wall for the reception of an article to be cut, one end of the pin terminating substantially in alignment with said face.

5. An attachment for a cutter as defined in claim 4 in which the main portion has a part extending therefrom at the side opposite the face which is adapted to align with the cutting edge of said one of the blades of the cutter, the groove is formed at least in part in said extension, the main portion extends both forwardly and rearwardly of the opening in the flange, and the flange extends from said main portion both forwardly and rearwardly of said opening.

CHARLES G. SCOTT.

REFERENCES CITED

The following references are of record in the file of this patent:

UNITED STATES PATENTS

| Number | Name | Date |
|---|---|---|
| 974,118 | Burke | Nov. 1, 1910 |
| 1,263,178 | Wiling | Apr. 16, 1918 |
| 2,465,207 | Day | Mar. 22, 1949 |